US012199339B2

(12) United States Patent
Cerretelli et al.

(10) Patent No.: US 12,199,339 B2
(45) Date of Patent: Jan. 14, 2025

(54) ANTENNA FOR MOTOR VEHICLES

(71) Applicant: ASK Industries S.p.A., Monte San Vito (IT)

(72) Inventors: Matteo Cerretelli, Sesto Fiorentino (IT); Agnese Mazzinghi, Florence (IT); Angelo Freni, Florence (IT); Andrea Notari, Scandiano (IT); Fabio Casoli, Reggio Emilia (IT); Stefano Lenzini, Modena (IT)

(73) Assignee: ASK Industries S.p.A., Monte San Vito (IT)

( * ) Notice: Subject to any disclaimer, the term of this patent is extended or adjusted under 35 U.S.C. 154(b) by 153 days.

(21) Appl. No.: 18/107,626

(22) Filed: Feb. 9, 2023

(65) Prior Publication Data

US 2023/0253707 A1 Aug. 10, 2023

(30) Foreign Application Priority Data

Feb. 10, 2022 (IT) ........................ 102022000002453

(51) Int. Cl.

| | |
|---|---|
| ***H01Q 1/32*** | (2006.01) |
| ***H01Q 3/24*** | (2006.01) |
| ***H01Q 13/06*** | (2006.01) |
| ***H01Q 21/20*** | (2006.01) |

(52) U.S. Cl.

CPC ........... *H01Q 1/3275* (2013.01); *H01Q 3/242* (2013.01); *H01Q 13/06* (2013.01); *H01Q 21/20* (2013.01)

(58) Field of Classification Search

CPC ............ H01Q 1/12; H01Q 1/32; H01Q 1/325; H01Q 1/3275; H01Q 1/36; H01Q 1/42; H01Q 3/242; H01Q 5/55; H01Q 13/06; H01Q 13/065; H01Q 21/0012; H01Q 21/0062; H01Q 21/20; H01Q 21/28; H01Q 21/29; H01Q 23/00; H01Q 25/00; H01Q 25/005

See application file for complete search history.

(56) References Cited

U.S. PATENT DOCUMENTS

| | | | | |
|---|---|---|---|---|
| 2004/0085249 | A1 | 5/2004 | Kitamori et al. | |
| 2017/0110790 | A1 | 4/2017 | Kim | |
| 2022/0294102 | A1 * | 9/2022 | Cenanovic ............... | H01Q 1/52 |

OTHER PUBLICATIONS

Italian Search Report for IT 202200002453 dated Sep. 23, 2022.

* cited by examiner

*Primary Examiner* — Robert Karacsony

(74) *Attorney, Agent, or Firm* — B. Aaron Schulman, Esq.; Stites & Harbison, PLLC

(57) ABSTRACT

An antenna for a motor vehicle, comprising: a mounting base made of electrically conductive material and suitable for being connected to a mounting surface of the motor vehicle; a cover suitable for being connected to and delimit, together with the mounting base, a housing space; a plurality of radiating elements suitable for transceiving signals and being housed, at least partially, in the housing space. The plurality of radiating elements comprises a group of waveguides configured to transceive millimeter-wave signals.

11 Claims, 4 Drawing Sheets

ANTENNA FOR MOTOR VEHICLES

The present disclosure concerns an antenna for motor vehicles.

The antenna according to the disclosure is particularly suited for use in automobiles, e.g. mounted on the roof or another mounting surface of an automobile, and will be described herein by reference to such use without intending in any way to limit its possible application in other types of motor vehicles, e.g. buses, lorries, commercial vehicles, etc.

As is known motor vehicles have become true ‘ambulant’ nodes of modern communications systems, and may transmit or receive data and signals of various types to and from other vehicles, pedestrians, and fixed communications devices and structures, according to various standards and related frequency ranges, which have gradually been introduced over the years, such as LTE (Long Term Evolution), DMB (Digital Multimedia Broadcasting), RF, FM, etc.

To this end, motor vehicles require an ever-increasing number of antennas, which results in issues with the actual quality of the signals transmitted and received, for example in terms of possible interference between the signals transmitted and received by two or more antennas, and also related to adequate coverage of the communication space surrounding the vehicle, which is a particular concern in motor vehicles due to the presence of large numbers of metal parts that act as screens for the antennas themselves.

As such, the solution most commonly adopted is to equip motor vehicles with multiple antennas in different positions.

Although this solution provides good results in terms of coverage and the quality of the signals transmitted and received, it is not entirely satisfactory either in terms of costs or practical implementation, particularly in automobiles, where the available space is limited.

Currently, these issues are made more acute by the introduction of the new 5G (fifth generation) communications system, to which millimetre-wave (mmW) frequency bands have been allocated, and which thus require additional antennas to be installed on board vehicles.

Hence, there is space and desire to provide an improved antenna.

Thus, the present disclosure provides an antenna for a motor vehicle, comprising at least:
- a mounting base made of electrically conductive material and suitable for being connected to a mounting surface of said motor vehicle;
- at least one cover suitable for being connected to and delimit, together with said mounting base, a housing space;
- a plurality of radiating elements suitable for transceiving signals and being housed, at least partially, in said housing space, said plurality of radiating elements comprises a group of waveguides configured to transceive millimeter-wave signals.

The present disclosure provides also a vehicle comprising at least one antenna comprising at least:
- a mounting base made of electrically conductive material and suitable for being connected to a mounting surface of said motor vehicle;
- at least one cover suitable for being connected to and delimit, together with said mounting base, a housing space;
- a plurality of radiating elements suitable for transceiving signals and being housed, at least partially, in said housing space, said plurality of radiating elements comprises a group of waveguides configured to transceive millimeter-wave signals.

Other characteristics and advantages of the disclosure will become apparent from the following detailed description, which is provided by way of example only and without limitation, by reference the attached drawings, which show:

It should be noted that, in the following detailed description, components that are identical or similar from a structural and/or functional standpoint may have the same or different reference numbers, independently of whether they are shown in different embodiments of this disclosure or in different parts.

It should further be noted that, in order to provide a clear and concise description of this disclosure, the designs may not be to scale, and some characteristics of the description may be shown schematically.

Further, when the term “adapted” or “organized” or “configured” or “shaped”, or any similar term is used herein while referring to any component as a whole, or to any part of a component, or to a combination of components, it has to be understood that it means and encompasses correspondingly either the structure, and/or configuration and/or form and/or positioning.

Figure 1:
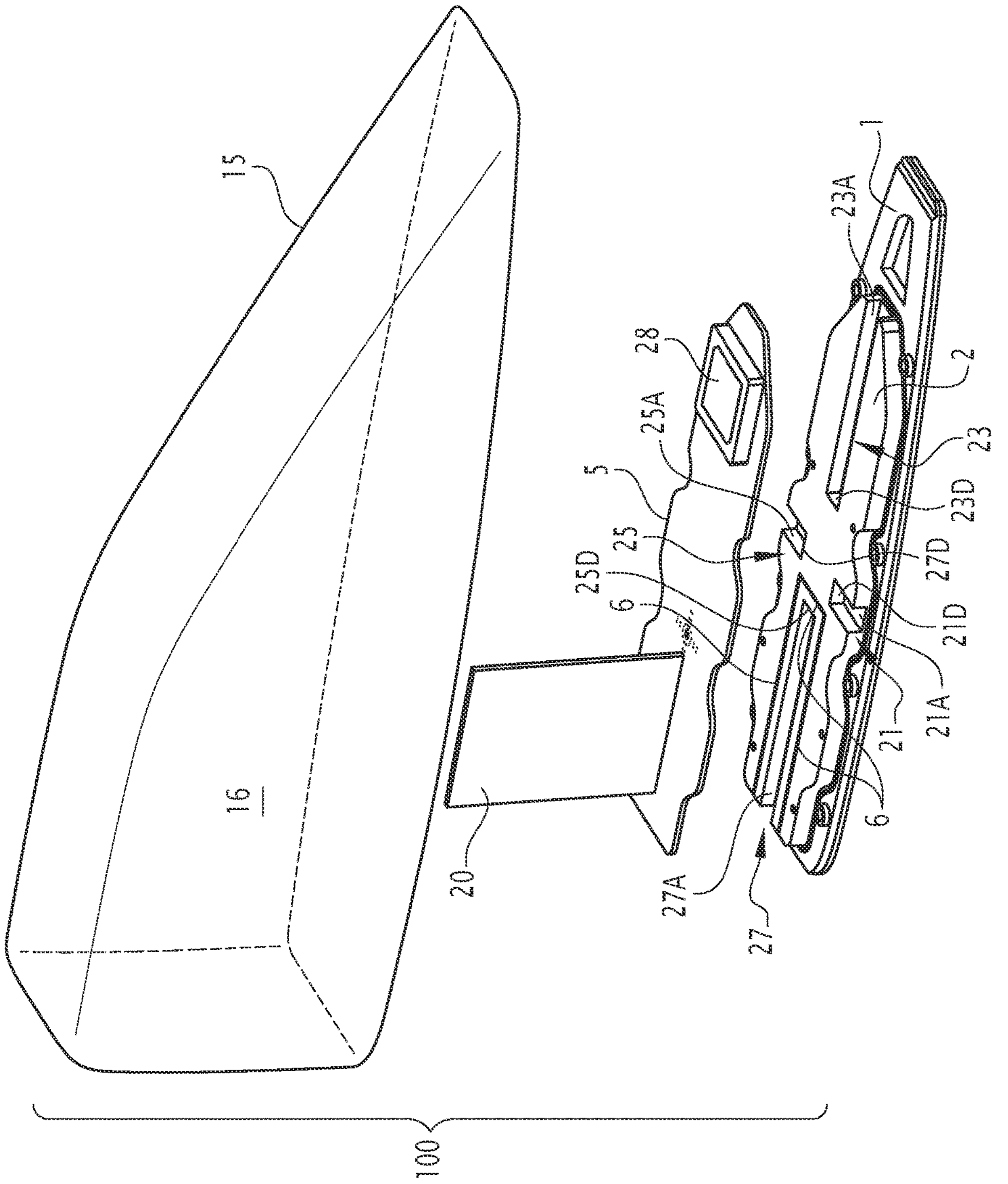
FIG. 1 is an exploded view of one possible embodiment of various components of the antenna according to the disclosure.

FIG. 1 is an exploded view showing one possible embodiment of various components of an antenna according to the disclosure, indicated as a whole by the reference numeral 100, to be mounted on a motor vehicle, e.g. on the roof or any other outer surface of a motor vehicle that is suited for mounting and positioning the antenna 100, be it a metal, glass, or plastic surface, or made of any other material.

The mounting may be carried out by modalities known or easily implementable by those skilled in the art, which modalities, in any case, are not relevant to the purposes of this disclosure and will thus not be described in detail.

As shown in FIG. 1, the antenna 100 according to the disclosure comprises at least:
- a mounting base 1 which is made of electrically conductive material and is suitable for being connected to the mounting surface of the motor vehicle;
- at least one cover 15 suitable for being connected to and delimit, together with the mounting base 1, a housing space 16; and
- a plurality of radiating elements 20, 21, 23, 25, 27, 28 suitable for transmitting and receiving signals, and to be housed, at least partially, in the housing space 16.

The mounting base 1 may be made of any electrically conductive material, e.g. zamac, aluminium, or plastic that has been plated or suitably loaded with conductive particles.

In turn, the cover 15 consists of a hollow shaped body, made, e.g. of plastic.

Usefully, in the antenna 100 according to the disclosure, the plurality of radiating elements comprises a group of waveguides 21, 23, 25, 27 configured so as to transmit and receive millimetre-wave signals, preferably in the frequency range between 20 GHz and 100 GHz.

In the exemplary embodiment shown in FIG. 1, in addition to the millimetre-wave waveguides, two other radiating elements 20 and 28, respectively suited to transmit and receive signals in other frequency bands, e.g. according to the LTE and GPS standards, are also schematically shown; of course, in the antenna 100 according to the disclosure, additional radiating elements and/or elements operating according to other standards may be used.

The waveguides 21, 23, 25, 27 are positioned relative to one another such that each has an assigned transmitting-receiving direction.

In particular, in one possible embodiment, shown for example in FIG. 1, the group of waveguides 21, 23, 25, 27 comprises, or consists of, four waveguides arranged substantially in a cross configuration relative to one another.

Alternatively, the group of waveguides used in the antenna 100 according to the disclosure comprises, or consists of, more than four waveguides, e.g. five or more, arranged in a star configuration.

In this case, the mounting base 1 may be made, for example, of a metal body substantially circular in shape.

Figure 3:
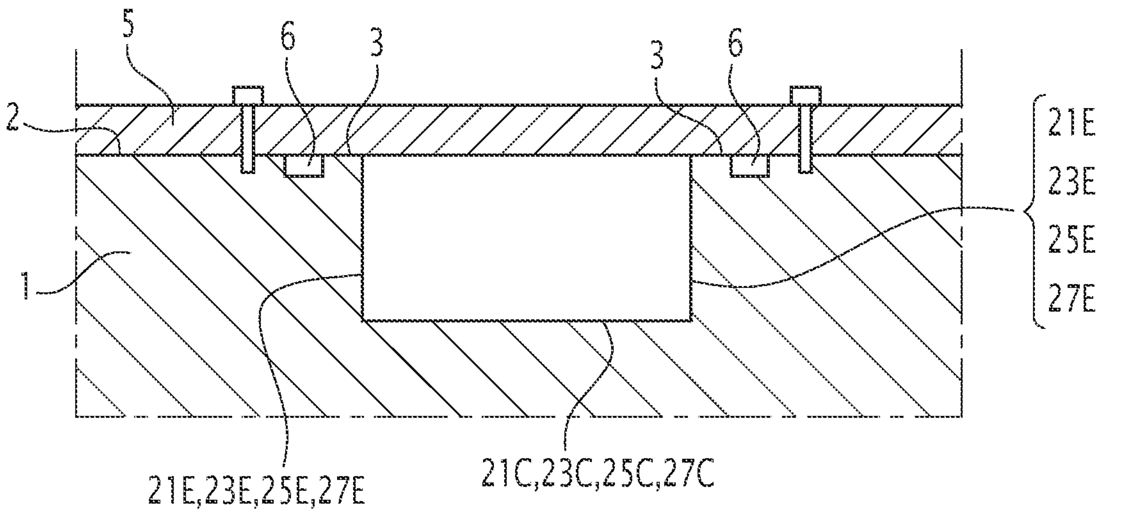
FIG. 3 is a schematic front view of possible embodiments of various components of the antenna according to the disclosure.
Figure 4:
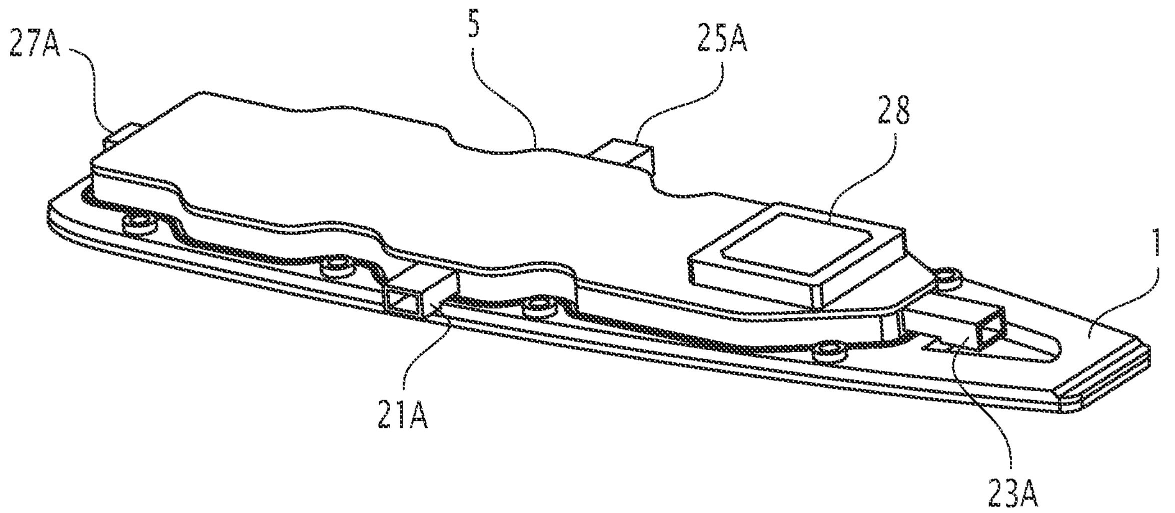
FIG. 4 is a perspective view of possible embodiments of various components of the antenna according to the disclosure.

In one possible embodiment, as shown in FIGS. 1, 3, and 4, one or more of the waveguides 21, 23, 25, 27, preferably all of them, have a quadrangular cross-section, more preferably a square or rectangular cross-section.

Alternatively, one or more of the waveguides used have a circular or elliptical cross-section.

In a possible embodiment, the antenna 100 comprises at least one additional element, shown in FIGS. 1, 3, and 4 with the reference numeral 5, which is fixed to the top side of the mounting base 1.

In turn, the waveguides 21, 23, 25, 27, as shown in FIG. 1, have each a hollow tubular body consisting, at least in part, of a corresponding cavity 21A, 23A, 25A, 27A formed in the mounting base 1 and closed on top by at least one additional element 5, as shown in FIG. 4.

Figure 2:
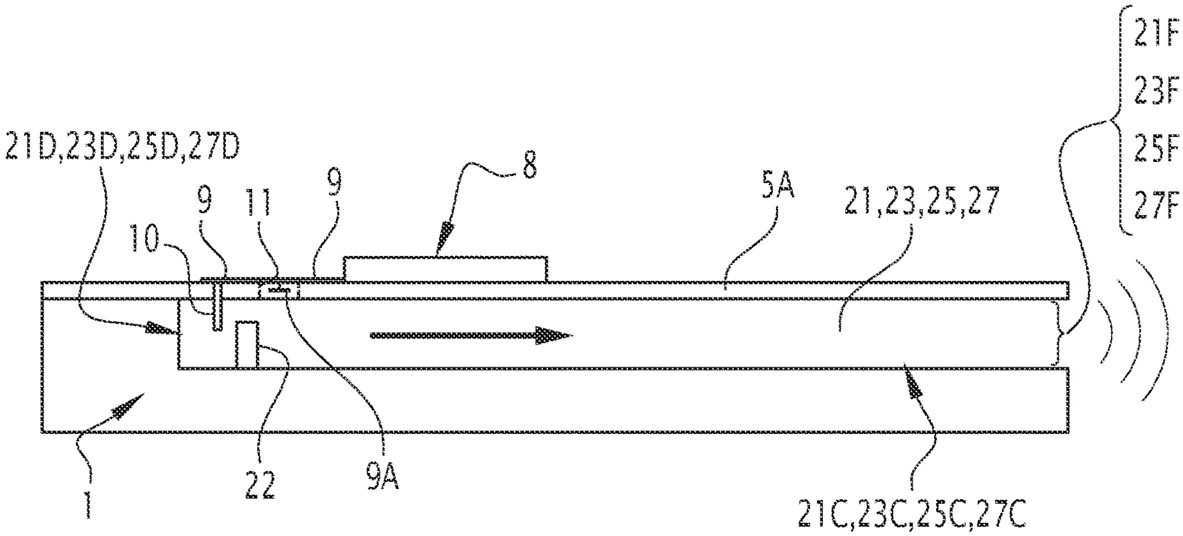
FIG. 2 is a schematic side view of possible embodiments of various components of the antenna according to the disclosure.

In particular, in this embodiment, as can be seen in FIG. 1, each waveguide 21, 23, 25, and 27 comprises a lower or bottom wall, indicated in FIGS. 2 and 3 by the respective reference numerals 21C, 23C, 25C, and 27C, which is opposite the additional element 5, a closed rear wall, indicated in FIG. 1 by the respective reference numerals 21D, 23D, 25D, and 27D, one or more side walls that extend from the closed rear and bottom walls, and an open front wall, indicated in FIG. 2 by the respective reference numerals 21F, 23F, 25F, and 27F, opposite the closed rear wall.

For example, as shown in FIG. 3, in the case of waveguides having a quadrangular cross-section, each waveguide comprises two walls extending parallel to one another from the bottom wall to the open front wall, and are both indicated in FIG. 3 by the respective reference numerals 21E, 23E, 25E, and 27E.

In one possible embodiment, the mounting base 1 comprises an upper surface 2, that is substantially planar, to support the additional element 5, which has protuberances indicated in FIG. 3 by reference numeral 3 corresponding to the upper edges of at least a portion of the two side walls 21E, 23E, 25E, and 27E and of the closed rear wall 21D, 23D, 25D, and 27D of each waveguide.

The protuberances 3 extend towards and are arranged to establish mechanical interference with the additional element 5 when this latter is affixed to the mounting base 1.

In practice, the protuberances 3 form a protruding border around the upper perimeter edge of each waveguide so as to ensure the best possible electrical contact between the two components 1 and 5 that are arranged facing one another.

In one embodiment, the mounting base 1 comprises at least one slot extending around at least one portion of the side walls 21E, 23E, 25E, and 27E and the closed rear wall 21D, 23D, 25D, and 27D.

The slot, indicated in FIG. 1 by the reference numeral 6, is formed for example by rectilinear sections, each of which is arranged at a predetermined distance and substantially parallel to the corresponding side wall or bottom wall of a waveguide.

For the sake of simplicity, in FIG. 1 the slot is illustrated only around the waveguide 27; of course, the slot 6 may be provided for any waveguide used, preferably for all of them.

In one possible embodiment, the or each slot 6 has a depth equal to approximately one quarter of the wavelength.

Moreover, each slot 6 or section thereof is arranged at a distance from the respective edge of the associated waveguide that is approximately equal to a quarter of the wavelength.

Moreover, depending on the application, the slots 6 around each waveguide may be used alternatively or in addition to the protuberances 3, as shown schematically in FIG. 3.

In a possible embodiment, as shown schematically in FIG. 2, the additional element 5 comprises a support or layer 5A, on which there is defined at least one conductor 9 suitable to be connected to electronic control means of at least one of the waveguides 21, 23, 25, and 27.

This conductor 9 may be formed for example by a strip of conductive material, e.g. copper.

In addition, as shown in FIG. 2, the antenna 100 comprises a pin 10 that is connected to one end of the conductor 9 and protrudes into the at least one waveguide in order to exchange, via the conductor 9 itself, the millimetre-wave signals to be transceived between the electronic means and the at least one waveguide.

In one possible embodiment, a conductor 9 and a respective pin 10 are provided for each of the waveguides used.

In another possible embodiment, shown in FIG. 2 by dotted lines, the conductor 9 associated with at least one of the waveguides comprises an end portion 9A which extends, in a non-metallised opening 11, above at least one waveguide and thus faces the inside thereof, and is configured for transmitting and receiving millimetre-wave signals.

In practice, in this embodiment, the end portion 9A is used as an alternative to the pin 10 and has a cross-section or width greater than the conductor itself. For example, the conductor 9 may be rectangular and widen at its end to form the wider square or rectangular end portion 9A.

In this case, too, a conductor 9 having a respective widened end portion 9A is preferably provided for each of the waveguides used.

In a possible embodiment, as shown, e.g., in FIG. 4, one or more of, preferably all, the waveguides used comprise a hollow tubular body constituted by a first section consisting of the through-hole 21A, 23A, 25A, 27A formed in the mounting base 1 and closed on top by the additional element 5, as described above, and, additionally, by a second section 21B, 23B, 25B, 27B consisting of a hollow tubular element made of electrically conductive material, e.g. the same as the mounting base 1, which is arranged contiguously to the respective first section and protrudes laterally away from the mounting base 1.

Conveniently, in one possible embodiment, the electronic means for controlling the various radiating elements of the antenna 100, in particular the waveguides 21, 23, 25, 27, comprise at least one printed circuit board.

In particular, the at least one printed circuit board comprises a chip, indicated in FIG. 2 by the reference numeral 8, which is configured to selectively control at least one waveguide of the plurality of waveguides 21, 23, 25, 27.

In this case, the chip 8 is connected, e.g., to the conductor 9, the free end of which is connected to the pin 10 or includes the end portion 9A.

In particular, it is possible to use a single chip 8 for all waveguides used, with the chip 8 that is connected to each of the waveguides, via a corresponding conductor 9, and selectively selects case by case the waveguide to transmit signals alternatively, it is possible to use more chips, each of which is connected to one or more waveguides.

Conveniently, in one possible embodiment, the additional element 5 comprises or consists of the at least one printed circuit board, the lower surface of which, which closes the top of the cavity of the waveguides, is metallised.

In this case, the support 5A shown in FIG. 2 may consist of a substrate of the board itself.

Alternatively, the element 5 may be formed from a plate of conductive material, and the printed circuit board may be positioned above the plate.

In one possible embodiment that is not shown in detail in the figures, each waveguide 21, 23, 25, 27 has a hollow tubular body formed completely from a corresponding cavity formed entirely in the mounting base 1.

In additional alternative embodiments that are also not shown in the figures, e.g. in FIG. 6, each waveguide 21, 23, 25, 27 comprises, or consists of, a hollow tubular element made of electrically conductive material and arranged, in the housing space 16, above the mounting base 1 and at a certain distance from it, or externally adjacent and around the sides of the mounting base 1 itself.

Usefully, one or more of, preferably all, the waveguides 21, 23, 25, 27 used comprise each at least one iris, indicated schematically in FIG. 2 by the reference numeral 22, which is arranged inside the respective waveguide.

Additionally, one or more, preferably all, of the waveguides 21, 23, 25, 27 used are at least partially filled with a dielectric material, e.g. a resin.

In practice, it has been shown that the antenna 100 according to the disclosure includes among its components also the radiating elements for transmitting and receiving millimetre-wave signals for 5G applications, with a compact structure that allows for adequate coverage of the transmitting-receiving field of those signals, and that can be easily produced at relatively low cost.

Of course, without prejudice to the principle of the disclosure, the embodiments and specific implementations may be widely varied from the purely exemplary and non-limiting descriptions and illustrations herein provided, without leaving the scope of this disclosure as defined in the claims appended hereto, including any possible combination, in whole or in part, of the possible embodiments above described. For example, the antenna 100 may comprise a second cover or outer cover that is suited to cover the cover 15 on the outside and substantially serves as a cover for aesthetic purposes; there may be more printed circuit boards, e.g. two boards arranged adjacent to and aligned with one another, both affixed to the mounting base 1 and operatively linked to the various radiating elements, etc.

The invention claimed is:

1. An antenna for a motor vehicle, comprising at least:
- a mounting base made of electrically conductive material and suitable for being connected to a mounting surface of said motor vehicle;
- at least one cover suitable for being connected to and delimit, together with said mounting base, a housing space;
- a plurality of radiating elements suitable for transceiving signals and being housed, at least partially, in said housing space, said plurality of radiating elements comprises a group of waveguides configured to transceive millimeter-wave signals;
- at least one further element fixed to said mounting base;
- wherein each wavequide has a hollow tubular body formed, at least in part, by a corresponding cavity obtained in the mounting base and closed by said at least one further element.

2. The antenna according to claim 1, wherein said group of waveguides comprises or consists of four waveguides arranged substantially in a cross configuration to each other or five or more waveguides arranged in a star pattern.

3. The antenna according to claim 1, wherein each waveguide comprises a bottom wall opposite said further element, a rear wall, one or more side walls extending from said rear wall, and an open front wall opposite said rear wall, and wherein the mounting base includes a substantially planar, top surface of abutment for said further element, said top surface having, at the upper edges of the one or more side walls and the rear wall of each waveguide, protuberances extending toward and capable of establishing mechanical interference with said further element when said further element is secured to the mounting base.

4. The antenna according to claim 1, wherein each waveguide comprises a bottom wall opposite said further element, a rear wall, one or more side walls extending from said rear wall and an open front wall opposite said rear wall, and wherein said mounting base includes at least one slot extending around at least a portion of and spaced apart from each of said side and rear walls.

5. The antenna according to claim 1, wherein said further element comprises a support on which there is provided at least one conductor suitable for being connected to electronic means for driving at least one waveguide of said group of waveguides, and wherein there is provided a pin which is connected to said conductor and protrudes into said waveguide for exchanging, through said conductor, millimeter-wave signals to be transceived between said electronic means and the at least one waveguide.

6. The antenna according to claim 1, wherein said further element comprises a support on which there is provided at least one conductor suitable for being connected to electronic means for driving at least one waveguide of said group of waveguides, said conductor having an end portion which extends into an opening facing the at least one waveguide and is configured for transceiving millimeter-wave signals.

7. The antenna according to claim 1, wherein said further element comprises at least one printed circuit board.

8. The antenna according to claim 7, wherein said printed circuit board comprises a chip configured to selectively drive at least one waveguide of said group of waveguides.

9. A motor vehicle comprising at least one antenna according to claim 1.

10. An antenna for a motor vehicle, comprising at least:
- a mounting base made of electrically conductive material and suitable for being connected to a mounting surface of said motor vehicle;
- at least one cover suitable for being connected to and delimit, together with said mounting base, a housing space;

a plurality of radiating elements suitable for transceiving signals and being housed, at least partially, in said housing space, said plurality of radiating elements comprises a group of waveguides configured to transceive millimeter-wave signals;

wherein at least one of said waveguides comprises a hollow tubular body formed by a first section comprising a through cavity formed in the mounting base and closed at the top by at least one further element and a second section formed by a hollow tubular element which is arranged contiguous to said first section and extends away from the mounting base.

11. A motor vehicle comprising at least one antenna according to claim 10.

* * * * *